(12) United States Patent
Fukuyama

(10) Patent No.: US 11,499,254 B2
(45) Date of Patent: Nov. 15, 2022

(54) BRAIDED PROTECTIVE SLEEVE WITH HEAT-SHRINKABLE YARNS AND METHOD OF CONSTRUCTION THEREOF

(71) Applicant: FEDERAL-MOGUL POWERTRAIN LLC, Southfield, MI (US)

(72) Inventor: Shozo Fukuyama, Tokyo (JP)

(73) Assignee: Federal-Mogul Powertrain LLC, Southfield, MI (US)

( * ) Notice: Subject to any disclaimer, the term of this patent is extended or adjusted under 35 U.S.C. 154(b) by 375 days.

(21) Appl. No.: 16/749,725

(22) Filed: Jan. 22, 2020

(65) Prior Publication Data

US 2020/0232132 A1 Jul. 23, 2020

Related U.S. Application Data

(60) Provisional application No. 62/795,999, filed on Jan. 23, 2019.

(51) Int. Cl.
*D04C 1/06* (2006.01)
*D04C 1/02* (2006.01)

(52) U.S. Cl.
CPC ............... *D04C 1/02* (2013.01); *D04C 1/06* (2013.01); *D10B 2331/061* (2013.01)

(58) Field of Classification Search
CPC ...... D04C 1/02; D04C 1/06; D10B 2331/061; B29C 61/025
See application file for complete search history.

(56) References Cited

U.S. PATENT DOCUMENTS

| | | | | |
|---|---|---|---|---|
| 3,669,157 A | * | 6/1972 | Woodall, Jr. | ........ B29C 61/0658 28/142 |
| 4,741,087 A | * | 5/1988 | Plummer, Jr. | ........... D04C 1/02 138/123 |
| 4,777,859 A | * | 10/1988 | Plummer, Jr. | ........... D04C 1/06 87/8 |
| 6,265,039 B1 | * | 7/2001 | Drinkwater | .......... G02B 6/4476 428/36.1 |
| 2010/0322776 A1 | | 12/2010 | Laurent | |

(Continued)

FOREIGN PATENT DOCUMENTS

CN 101927568 A 12/2010
CN 103842568 A 6/2014

(Continued)

OTHER PUBLICATIONS

International Search Report, dated May 18, 2020.

*Primary Examiner* — Shaun R Hurley
(74) *Attorney, Agent, or Firm* — Robert L. Stearns; Dickinson Wright, PLLC

(57) ABSTRACT

A protective textile sleeve and method of construction thereof is provided. The sleeve includes a seamless, tubular braided wall having a plurality of yarns braided with one another. A plurality of the yarns are high temperature, non-heat-shrinkable yarns and a plurality of the yarns are heat-shrinkable yarns, wherein the heat-shrinkable yarns are shrinkable at a temperature that does not cause the high temperature, non-heat-shrinkable yarns to shrink. The sleeve has a first length and first thickness upon being braided, and a second length that less than the first length and a second thickness that is greater than the first thickness upon being exposed to a single heat-treat process.

19 Claims, 2 Drawing Sheets

(56) References Cited

U.S. PATENT DOCUMENTS

| | | | |
|---|---|---|---|
| 2011/0209601 | A1 | 9/2011 | Relats Casas et al. |
| 2013/0125739 | A1 | 5/2013 | Kinugasa |
| 2014/0220276 | A1 | 8/2014 | Gao et al. |
| 2017/0121868 | A1 | 5/2017 | Zhang et al. |
| 2018/0057982 | A1 | 3/2018 | Qiu et al. |

FOREIGN PATENT DOCUMENTS

| | | |
|---|---|---|
| CN | 104562425 A | 4/2015 |
| EP | 2355278 A2 | 8/2011 |

\* cited by examiner

BRAIDED PROTECTIVE SLEEVE WITH HEAT-SHRINKABLE YARNS AND METHOD OF CONSTRUCTION THEREOF

CROSS-REFERENCE TO RELATED APPLICATION

This application claims the benefit of U.S. Provisional Application Ser. No. 62/795,999, filed Jan. 23, 2019, which is incorporated herein by way of reference in its entirety.

BACKGROUND OF THE INVENTION

1. Technical Field

This invention relates generally to textile sleeves, and more particularly to braided textile sleeves and to their method of construction.

2. Related Art

It is known to protect temperature sensitive elongate members, such as wires and temperature sensitive sensors connected thereto with heat resistant tubular members, such as solid polymeric or metal tubing. Although known tubing can provide protection to wires extending therethrough against high heat, such tubing is generally stiff and inflexible, and thus, the ability to route the wires along meandering paths is limited. Some attempts to provide more flexible tubular members, such as via braiding, have been made; however, the heat resistance of such braided tubular members, also referred to a sleeves or sheaths, is generally limited to temperatures below about 280 degrees Fahrenheit. In addition, the resistance to abrasion provided by braided sleeves is generally low, and thus, the sleeves can be worn over time, thereby subjecting the wire(s) therein to damage.

Accordingly, what is needed is a protective sleeve that provides protection to an elongate member extending therethrough against high heat, such as temperatures above 280 degrees Fahrenheit, that is flexible, is abrasion resistant and is resistant to fraying.

SUMMARY OF THE INVENTION

In accordance with one aspect of the invention, a protective textile sleeve includes a seamless, circumferentially continuous, tubular braided wall extending lengthwise along a central longitudinal axis between opposite ends. The wall includes a plurality of yarns braided with one another, with a plurality of the yarns being high temperature, non-heat-shrinkable yarn and a plurality of the yarns being heat-shrinkable yarns. The heat-shrinkable yarns are shrinkable at a temperature that does not cause the high temperature, non-heat-shrinkable yarns to shrink, or at least does not cause the high temperature, non-heat-shrinkable yarns to shrink substantially. Accordingly, by way of example and without limitation, the heat-shrinkable yarns may shrink lengthwise greater than 10 percent of their original length, such as between about 10-90 percent of their original length or more, while the non-heat-shrinkable yarn may shrink about 2 percent of their original length or less when the sleeve is exposed to a heat-shrink, heat treatment process.

In accordance with another aspect of the invention, the heat-shrinkable and non-heat-shrinkable yarns are braided with one another such that the heat-shrinkable yarns, upon being shrunk, cause the non-heat-shrinkable yarns to be axially compressed (gathered, bunched, warped) such that the thickness of the braided wall of the sleeve is increased by between about 25-90 percent relative to the thickness prior to heat-shrinking the heat-shrinkable yarns, with the increased wall thickness providing an increased resistance to abrasion, an increased resistance to fraying, an increased resistance to the ingress of contamination, an increased level of thermal insulation and an increased level of protection against high temperature thermal conditions.

In accordance with another aspect of the invention, upon heat-shrinking the heat-shrinkable yarns, the non-heat-shrinkable yarns are axially compressed and bunched between the heat-shrink yarns, thereby increasing the density of the wall, which in turn increases the resistance to abrasion, increases the thermal insulation and increases the level of protection against high temperature thermal conditions, increases the resistance to the ingress of contamination, and increases the resistance to fraying of the yarns upon cutting the sleeve wall to length and fraying of the ends of the sleeve while in use.

In accordance with another aspect of the invention, the non-heat-shrinkable yarn and the heat-shrinkable yarn can be provided in an equal number of ends braided with one another, thereby providing a uniform appearance and a uniform level of protection about the entirety of the sleeve.

In accordance with another aspect of the invention, the non-heat-shrinkable yarn and the heat-shrinkable yarn can be braided in a respective 1:1 braid pattern, with the non-heat-shrinkable yarn and the heat-shrinkable yarn alternating with one another in opposite S and Z helical directions.

In accordance with another aspect of the invention, the non-heat-shrinkable yarn can be provided as a monofilament and/or multifilament, as desired, to provide the sleeve with the desired type of abrasion resistance protection, coverage and flexibility.

In accordance with another aspect of the invention, the non-heat-shrinkable yarn can be provided as aramid multifilament, thereby enhancing the resistance of the sleeve to degradation when exposed to high temperatures, such as in excess of 280 degrees Fahrenheit.

In accordance with another aspect of the invention, the heat-shrinkable yarn can be provided as polyether ether ketone (PEEK) monofilament.

In accordance with another aspect of the invention, a protective braided sleeve includes a seamless, circumferentially continuous, flexible tubular wall extending lengthwise along a central longitudinal axis between opposite ends, with the wall including a first plurality of yarns braided with a second plurality yarns, wherein the first plurality of yarns and the second plurality of yarns have different heat-shrink ratios from one another. The wall has a first thickness prior to exposing the wall to a predetermined temperature and a second thickness after exposing the wall to the predetermined temperature, with the second thickness being between about 25-90 percent greater than the first thickness, thereby increasing the abrasion resistance, increasing the resistance to the ingress of contamination, and increasing the heat-resistance of the wall.

In accordance with another aspect of the invention, the wall has a first length prior to exposing the wall to the predetermined temperature and a second length after exposing the wall to the predetermined temperature, the second length being less than the first length, thereby contributing to the increased abrasion resistance, the increased resistance to the ingress of contamination, and the increased heat-resistance of the wall.

In accordance with another aspect of the invention, the second length is at least 10 percent less than the first length.

In accordance with another aspect of the invention, the first plurality of yarns shrink lengthwise at least 10 percent of an as braided length upon exposing the wall to the predetermined temperature and the second plurality of yarns shrink lengthwise less than 2 percent of an as braided length upon exposing the wall to said predetermined temperature, thereby contributing to the increased thickness of the wall upon exposing the wall to the predetermined temperature, thus, increasing the abrasion resistance, the increased resistance to the ingress of contamination, and the increased heat-resistance of the wall.

In accordance with another aspect of the invention, the first plurality of yarns can be provide as monofilaments and the second plurality of yarns can be provided as multifilaments.

In accordance with another aspect of the invention, the wall can be braided including only the first plurality of yarns and the second plurality of yarns.

In accordance with another aspect of the invention, a method of constructing a protective textile sleeve includes braiding a plurality of non-activatable, non-heat-shrinkable yarns with a plurality of activatable, heat-shrinkable yarns to form a seamless tubular wall extending lengthwise along a central longitudinal axis, with the resulting braided wall being in a first, non-heat-treated state. Further, heat-treating the braided wall to a second, heat-treated state and causing the activatable, heat-shrinkable yarns to become activated and shrink lengthwise, while not causing the non-activatable, non-heat-shrinkable yarns to shrink lengthwise substantially, and causing the non-activatable, non-heat-shrinkable yarns to become bunched to take on a serpentine, meandering shape along the length of the shrunken yarns.

In accordance with another aspect of the invention, the method can further include braiding the non-heat-shrinkable yarns and the heat-shrinkable yarns in alternating relation with one another in a 1:1 braid pattern to provide the sleeve with a substantially balanced content and uniform distribution of the non-heat-shrinkable yarns and heat-shrinkable yarns.

In accordance with another aspect of the invention, the method can further include increasing a first thickness of the braided wall from when the wall is in the first, non-heat-treated state to a second thickness when the wall is in the second, heat-treated state, such as being greater than 25 percent, and preferably being greater than 50 percent, and more preferably being greater than 75 percent of the first thickness, thereby increasing the resistance of the wall to abrasion and increasing the thermal insulation properties of the wall to provide the elongate member bounded by the wall with enhanced protection against the ingress of contamination and against high temperature external environmental thermal conditions, such as above 280 degrees Fahrenheit.

In accordance with another aspect of the invention, the method can further include increasing a first density of the braided wall from when the wall is in the first, non-heat-treated state to a second density when the wall is in the second, heat-treated state, such that the second density is significantly greater than the first density, such as being greater than 25 percent, and preferably being greater than 50 percent, and more preferably being greater than 75 percent of the first density, thereby significantly increasing the resistance of the wall to abrasion, increasing the thermal insulation properties of the wall to provide the elongate member bounded by the wall with enhanced protection against high temperature external environmental thermal conditions, increasing the resistance to the ingress of contamination, and further increasing the resistance of the yarns to fraying while being cut and while in use.

In accordance with another aspect of the invention, a method of constructing a protective textile sleeve can include braiding a plurality of first yarns with a plurality of second yarns to form a seamless tubular wall extending lengthwise along a central longitudinal axis, with the resulting seamless tubular wall having a first thickness. Further, exposing the braided wall to a predetermined temperature and causing the first yarns to shrink lengthwise and causing the second yarns to become axially bunched under a force imparted by the shrunken first yarns causing the seamless tubular wall to expand to a second thickness that is greater than the first thickness.

In accordance with another aspect of the invention, the method can further include increasing the first thickness between about 25-90 percent to the second thickness upon exposing the braided wall to the predetermined temperature.

In accordance with another aspect of the invention, the method can further include increasing the first thickness between about 50-90 percent to the second thickness upon exposing the braided wall to the predetermined temperature.

In accordance with another aspect of the invention, the method can further include increasing the first thickness between about 70-90 percent to the second thickness upon exposing the braided wall to the predetermined temperature.

In accordance with another aspect of the invention, the method can further include causing the first yarns to shrink lengthwise at least 10 percent upon exposing the braided wall to the predetermined temperature and causing the second yarns to shrink lengthwise less than 2 percent upon exposing the braided wall to the predetermined temperature, thereby causing the first yarns to impart an axially directed force on the second yarns and causing the second yarns to be bunched to increase the thickness of the braided wall.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
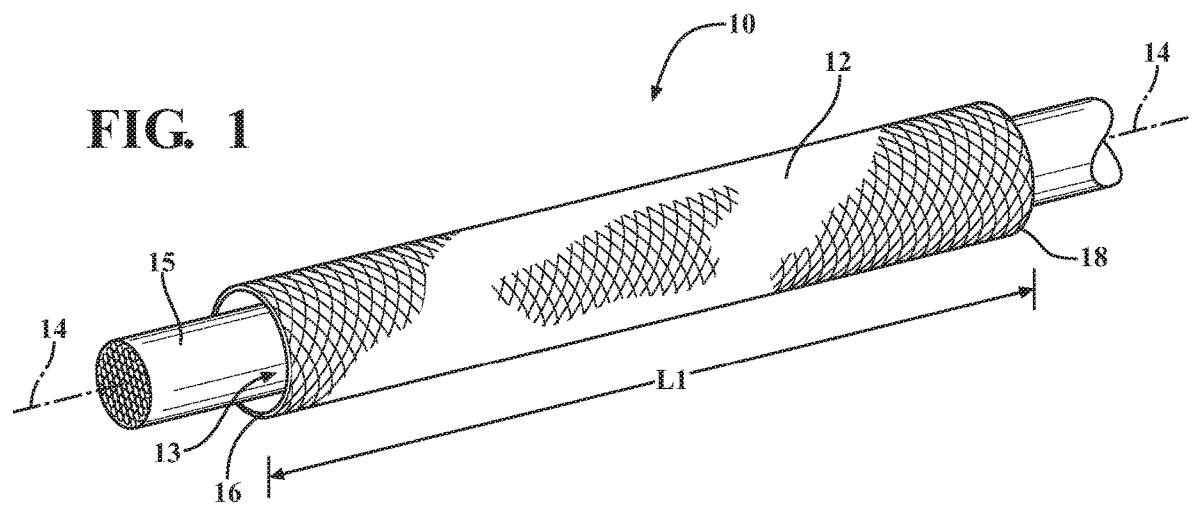
FIG. 1 is a schematic perspective view of a tubular braided sleeve constructed in accordance with one embodiment of the invention shown in a deactivated, as initially braided, non-heat-treated, first state with an elongate member to be protected disposed in a cavity thereof.
Figure 1A:
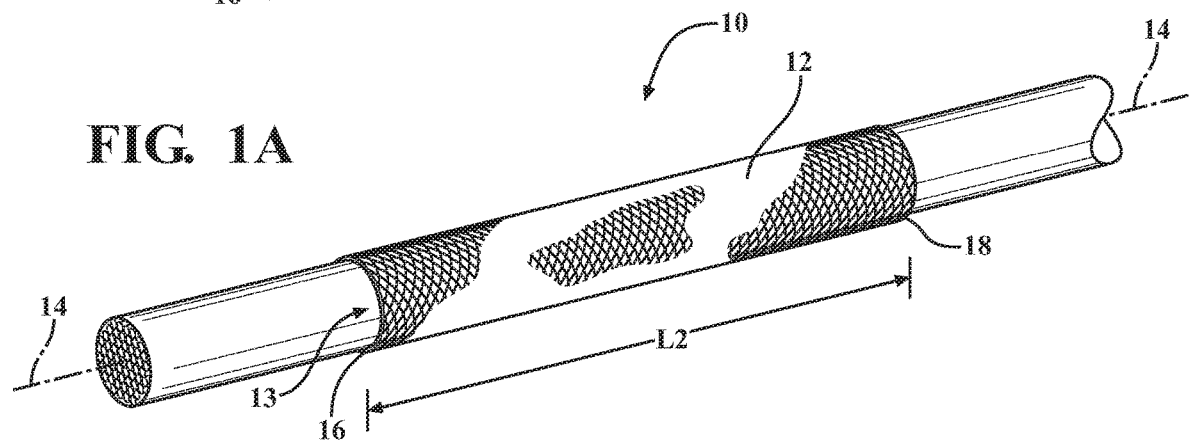
FIG. 1A is a view similar to FIG. 1 with the tubular braided sleeve shown in an activated, heat-treated, second state.
Figure 2:
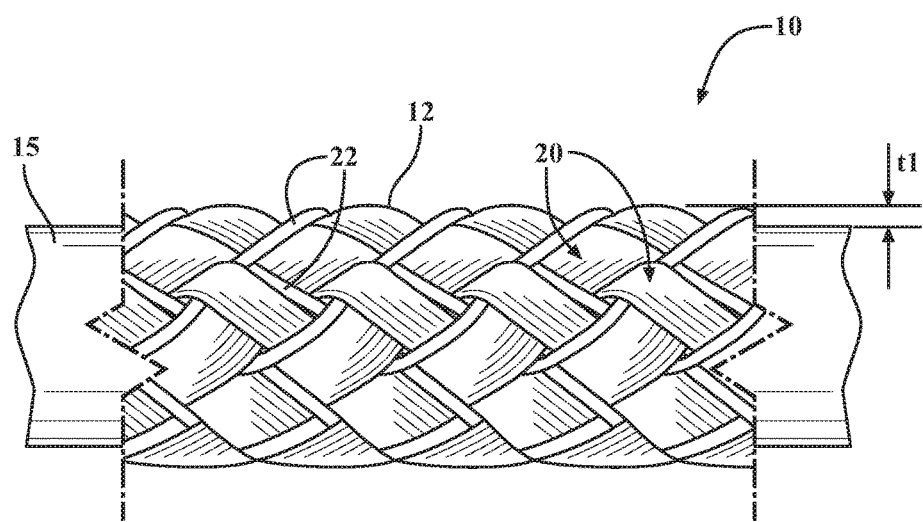
FIG. 2 is an enlarged schematic view of a portion of a wall of the tubular braided sleeve of FIG. 1 shown in a deactivated, as initially braided, non-heat-treated, first state.
Figure 2A:
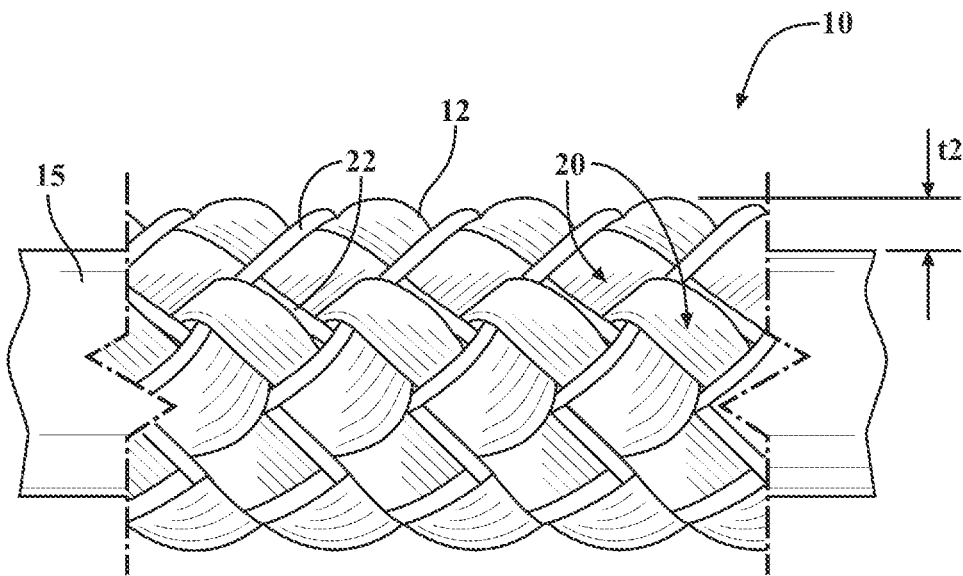
FIG. 2A is an enlarged schematic view of a portion of the wall of the tubular braided sleeve of FIG. 1A shown in an activated, heat-treated, second state.
Figure 3:
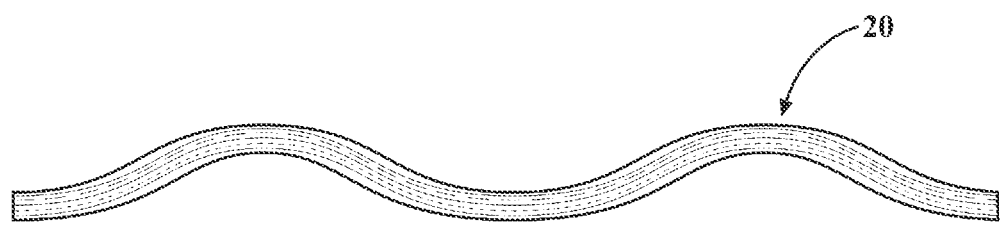
FIG. 3 is a side view of a non-heat-shrinkable, high temperature yarn braided in the wall of the tubular braided sleeve, with the non-heat-shrinkable, high temperature yarn shown prior to subjecting the tubular braided sleeve to a heat treatment process.
Figure 3A:
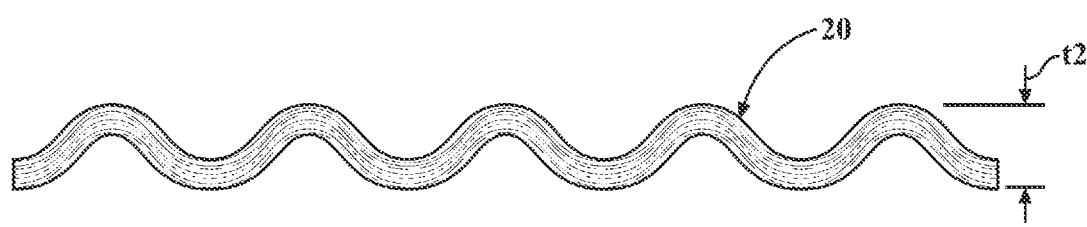
FIG. 3A is a view similar to FIG. 3 of the non-heat-shrinkable, high temperature yarn shown after subjecting the tubular braided sleeve to a heat treatment process.

Referring in more detail to the drawings, FIGS. 1-2A illustrate a tubular braided protective textile sleeve, referred to hereafter as sleeve 10, constructed in accordance with one aspect of the invention. The sleeve 10, as braided in a single, continuous braiding process, has a braided, circumferentially continuous, seamless tubular wall 12 bounding a through passage, also referred to as cavity 13, extending lengthwise along a central longitudinal axis 14 between open opposite ends 16, 18, wherein the cavity 13 receives an elongate member 15 to be protected, such as a wire harness, conduit, pipe, or the like. The wall 12 is braided including a plurality of ends (end, as understood in the art is a single yarn filament, whether a monofilament or a multifilament) of yarn braided with one another, with a plurality of the yarns being non-heat-shrinkable, high temperature yarns 20 (FIGS. 3 and 3A; high temperature meaning able to withstand temperatures in excess of 280 degrees Fahrenheit without being altered in material property or length) and a plurality of the yarns being heat-shrinkable yarns 22 (a cross-linked heat-shrinkable yarn meaning that the yarns 22 can be activated to shrink 10% or more, up to 90%, of their original, non-activated length; FIGS. 1 and 1A). The heat-shrinkable yarns 22 are shrinkable at a temperature in a heat-treatment process that does not cause the high temperature yarns 20 to shrink, or at least does not cause the high temperature yarns to shrink substantially. Accordingly, by way of example and without limitation, the heat-shrinkable yarns 22 may shrink lengthwise (axially) greater than 10 percent of their original length, such as between about 10-90 percent, while the non-heat-shrinkable, high temperature yarn 20 may shrink about 2 percent, or less, of their original length when the sleeve 10 is exposed to the heat treatment process. Accordingly, upon the sleeve 10 being heat-treated, the heat-shrinkable yarns 22 are shrunken lengthwise between about 10-90 percent, while the non-heat-shrinkable, high temperature yarn 20 remain substantially non-shrunk. As such, as shown in FIG. 3A, the non-heat-shrinkable, high temperature yarn 20 are caused to taken on a meandering, serpentine configuration along their length as a result of being axially compressed, also referred to as axially gathered, axially warped or axially bunched, such that the effective thickness of the braided wall 12 of the sleeve 10 is increased, such as by at least 25 percent, and more preferably between about 50-90 percent from a first thickness t1 (FIG. 2; illustrating a portion of the wall 12, with it to be recognized that the remaining unseen portion of the wall 12 is the same as the portion shown) before heat-shrinking the heat-shrinkable yarns 22, to a second thickness t2 (FIG. 2A; illustrating a portion of the wall 12, with it to be recognized that the remaining unseen portion of the wall 12 is the same as the portion shown) after heat-shrinking the heat-shrinkable yarns 22, and the density of the wall 12 is increased from a first density d1 before heat-shrinking the heat-shrinkable yarns 22 (FIG. 2) to a second density d2 after heat-shrinking the heat-shrinkable yarns 22 (FIG. 2A), wherein d2 is greater than 25 percent of d1, and preferably being greater than 50 percent, and more preferably being greater than 75 percent of d1. The increased wall thickness t2 and the increased density d2 provide synergies including an increased resistance to abrasion; an increased level of thermal insulation, an increased thermal protection against high temperature thermal conditions, and an increased resistance to fraying of the yarns 20, 22 upon cutting the sleeve wall 12 to length and fraying of the ends 16, 18 of the sleeve 10 while in use (FIG. 2A).

The braided yarns 20, 22 forming the entirety of the wall 12, or substantially entirety if other yarns are included, can be provided in a desired number of relative ends (an end is known as a single yarn) alternated with one another about the circumference of the sleeve 10 in the opposite S and Z helical directions (S and Z directions illustrated in the Figures, as would be understood by a skilled artisan in the textile arts upon viewing the disclosure herein) in any desired respective ratio of ends of high temperature yarn 20 to heat-shrinkable yarn 22, such as 1:1 (FIGS. 2 and 2A), to provide the sleeve 10 with a substantially circumferentially balanced content of the yarns 20, 22 and a uniform thickness and density about the circumference and along the length of the sleeve 10.

In accordance with another aspect of the disclosure, the heat-shrinkable yarn 22 can be provided as any suitable heat-shrinkable monofilament and/or multifilament. In one example, wherein a ¼ inch diameter sleeve was produced, by way of example and without limitation, the heat-shrinkable yarn 22 was provided as a monofilament of PEEK having a diameter of about 0.26 mm and a heat-shrink ratio of about 15 percent at a heat-treat temperature of about 280 degrees Fahrenheit, by way of example and without limitation. Further, in the example embodiment, the non-heat-shrinkable yarn 20 was provided as a multifilament of aramid having a diameter of about 0.13 mm and a heat-shrink ratio of about 0.5 percent at a heat-treat temperature of about 280 degrees Fahrenheit, by way of example and without limitation. Upon heat-treating the exemplary wall 12, such as at a temperature between about 250-320 degrees Fahrenheit for between about 0.5-3 minutes, by way of example and without limitation, the length shrink ratio was about 19 percent, such that the length L1 of the sleeve 10 (FIG. 1) prior to being heat-treated was reduced to a length L2 (FIG. 1A; L1×81%), while the thickness t1 of the wall 12 (FIG. 2) increased about 80 percent to t2 (FIG. 2A; caused by the axial bunching and meandering of the non-heat-shrinkable yarn 20, as shown in FIG. 3, prior to the wall 12 being heat-treated and in FIG. 3A after the wall 12 being heat-treated). The resulting sleeve 10 was provided with an increased resistance to an ingress of contamination, an increased resistance to abrasion and increased thermal properties allowing it to withstand and protect an electrical member contained therein against an external environmental temperature up to about 320 degrees Fahrenheit for up to about 40 hours, with the sleeve 10 retaining high flexibility and diametrically expansive properties. It is contemplated herein that any desired diameter sleeve can be produced using a suitably sized diameter non-heat-shrinkable yarn 20 and heat-shrinkable yarn 22 and number of ends thereof, as will be understood by a person possessing ordinary skill in the art.

In accordance with another aspect of the disclosure, a method of constructing a braided textile sleeve 10 is provided. The method includes braiding a plurality of yarns 20, 22 with one another to form a seamless tubular wall 12 extending lengthwise along a central longitudinal axis 14 in a first non-heat-treated state, with at least some of the yarns being provided as non-activatable, non-heat-shrinkable yarns 20 and at least some of the yarns being provided as activatable, heat-shrinkable yarns 22. Then, heat-treating the braided wall at a first temperature to cause the activatable, heat-shrinkable yarns 22 to shrink lengthwise, while not causing the non-activatable, non-heat-shrinkable yarns 20 to shrink or shrink substantially at the first temperature.

In accordance with another aspect of the disclosure, the method can further include braiding the non-heat-shrinkable yarns 20 and the heat-shrinkable yarns 22 in alternating relation with one another in a 1:1 braid pattern to provide the sleeve 10 with a substantially balanced content of the non-heat-shrinkable yarns 20 and heat-shrinkable yarns 22.

In accordance with another aspect of the disclosure, the method can further include heat-treating the braided wall 12 to cause the heat-shrinkable yarns 22 to shrink lengthwise between about 10-90 percent, while maintaining the non-heat-shrinkable yarns 20 in a non-heat-shrunk or substantially non-heat-shrunk state, such that the length of the non-heat-shrinkable yarns 20 remains within about 98 percent of their original, as braided, length.

In accordance with another aspect of the disclosure, the method can further include increasing a first thickness t1 of the braided wall 12 from when the wall 12 is in a first, non-heat-treated state to a second thickness t2 upon completing the heat-treating process, wherein the first thickness t1 is increased generally between about 25-90 percent to the second thickness t2, and preferably between about 50-90, and more preferably between about 70-90 percent, and in one embodiment, by about 80 percent, thereby increasing the abrasion resistance, density, thermal resistance and end-fray resistance of the wall 12.

Many modifications and variations of the present invention are possible in light of the above teachings. In addition, it is to be recognized that a braided tubular wall constructed in accordance with the various aspects of the invention can take on a multitude of uses, including that of a protective or bundling member, by way of example and without limitation. It is, therefore, to be understood that the invention may be practiced otherwise than as specifically described, and that the scope of the invention is defined by any ultimately allowed claims.

What is claimed is:

1. A protective braided sleeve, comprising:
a seamless, circumferentially continuous, flexible tubular wall extending lengthwise along a central longitudinal axis between opposite ends, said wall including a plurality of yarns braided with one another to provide said wall having a first thickness in a first non-heat-treated state, a first plurality of said plurality of yarns being substantially non-heat-shrinkable yarns and a second plurality of said plurality of yarns being cross-linked heat-shrinkable yarns, said wall being heat-treatable to transform said wall to a second heat-treated state, whereat said cross-linked heat-shrinkable yarns are shrunken lengthwise at a heat-treating temperature that does not cause said non-heat-shrinkable yarns to shrink substantially, thereby causing said substantially non-heat-shrinkable yarns to be axially bunched in the second heat-treated state, whereupon said wall is provided having a second thickness being between about 25-90 percent greater than said first thickness.

2. The protective braided sleeve of claim 1, said second thickness being between about 50-90 percent greater than said first thickness.

3. The protective braided sleeve of claim 1, said second thickness being between about 70-90 percent greater than said first thickness.

4. The protective braided sleeve of claim 1, wherein said wall has a first resistance to abrasion while in said first non-heat-treated state and a second resistance to abrasion while in said second heat-treated state, said second resistance to abrasion being greater than said first resistance to abrasion.

5. The protective braided sleeve of claim 1, wherein said wall has a first resistance to end fray while in said first non-heat-treated state and a second resistance to end fray while in said second heat-treated state, said second resistance to end fray being greater than said first resistance to end fray.

6. The protective braided sleeve of claim 1, wherein said wall has a first heat resistance while in said first non-heat-treated state and a second heat resistance while in said second heat-treated state, said second heat resistance being greater than said first heat resistance.

7. The protective braided sleeve of claim 1, wherein said wall has a first density while in said first non-heat-treated state and a second density while in said second heat-treated state, said second density being greater than said first density.

8. The protective braided sleeve of claim 1, wherein said non-heat-shrinkable yarns and said cross-linked heat-shrinkable yarns are braided with one another in equal numbers of ends, with said non-heat-shrinkable yarns and said cross-linked heat-shrinkable yarns being braided with one another in a 1:1 braid pattern, with said non-heat-shrinkable yarns and said cross-linked heat-shrinkable yarns alternating with one another in opposite S and Z helical directions.

9. The protective braided sleeve of claim 1, wherein said non-heat-shrinkable yarns are multifilaments and said cross-linked heat-shrinkable yarns are monofilaments.

10. A protective braided sleeve, comprising:
a seamless, circumferentially continuous, flexible tubular wall extending lengthwise along a central longitudinal axis between opposite ends, said wall including a first plurality of cross-linked heat-shrinkable yarns braided with a second plurality of yarns, with said first plurality of cross-linked heat-shrinkable yarns and said second plurality of yarns having different heat-shrink ratios from one another, said wall having a first thickness prior to exposing said wall to a heat-treatment process and a second thickness after exposing said wall to said heat-treatment process, said second thickness being between about 25-90 percent greater than said first thickness.

11. The protective braided sleeve of claim 10, wherein said wall has a first length prior to exposing said wall to said heat-treatment process and a second length after exposing said wall to said heat-treatment process, said second length being less than said first length.

12. The protective braided sleeve of claim 11, wherein said second length is at least 10 percent less than said first length.

13. The protective braided sleeve of claim 12, wherein said first plurality of cross-linked heat-shrinkable yarns shrink lengthwise at least 10 percent of an as braided length upon exposing said wall to said heat-treatment process and said second plurality of yarns shrink lengthwise less than 2 percent of an as braided length upon exposing said wall to said predetermined temperature.

14. The protective braided sleeve of claim 13, wherein said first plurality of cross-linked heat-shrinkable yarns are monofilaments and said second plurality of yarns are multifilaments.

15. A method of constructing a protective textile sleeve, comprising:
braiding a plurality of cross-linked heat-shrinkable first yarns with a plurality of second yarns to form a seamless tubular wall extending lengthwise along a central longitudinal axis, with the resulting seamless tubular wall having a first thickness; and heat-treating the braided wall and causing the cross-linked heat-shrinkable first yarns to shrink lengthwise and causing the second yarns to become axially bunched under a force imparted by the cross-linked heat-shrinkable first yarns causing the seamless tubular wall to expand to a second thickness that is greater than the first thickness.

16. The method of claim 15, further including increasing the first thickness between about 25-90 percent to the second thickness.

17. The method of claim 16, further including increasing the first thickness between about 50-90 percent to the second thickness.

18. The method of claim 15, further including increasing the first thickness between about 70-90 percent to the second thickness.

19. The method of claim 15, further including causing the cross-linked heat-shrinkable first yarns to shrink lengthwise at least 10 percent upon heat-treating the braided wall and causing the second yarns to shrink lengthwise less than 2 percent upon heat-treating the braided wall.

* * * * *